W. I. JONES.
MECHANICALLY OPERATED SCISSORS.
APPLICATION FILED APR. 4, 1914.
1,129,684.
Patented Feb. 23, 1915.
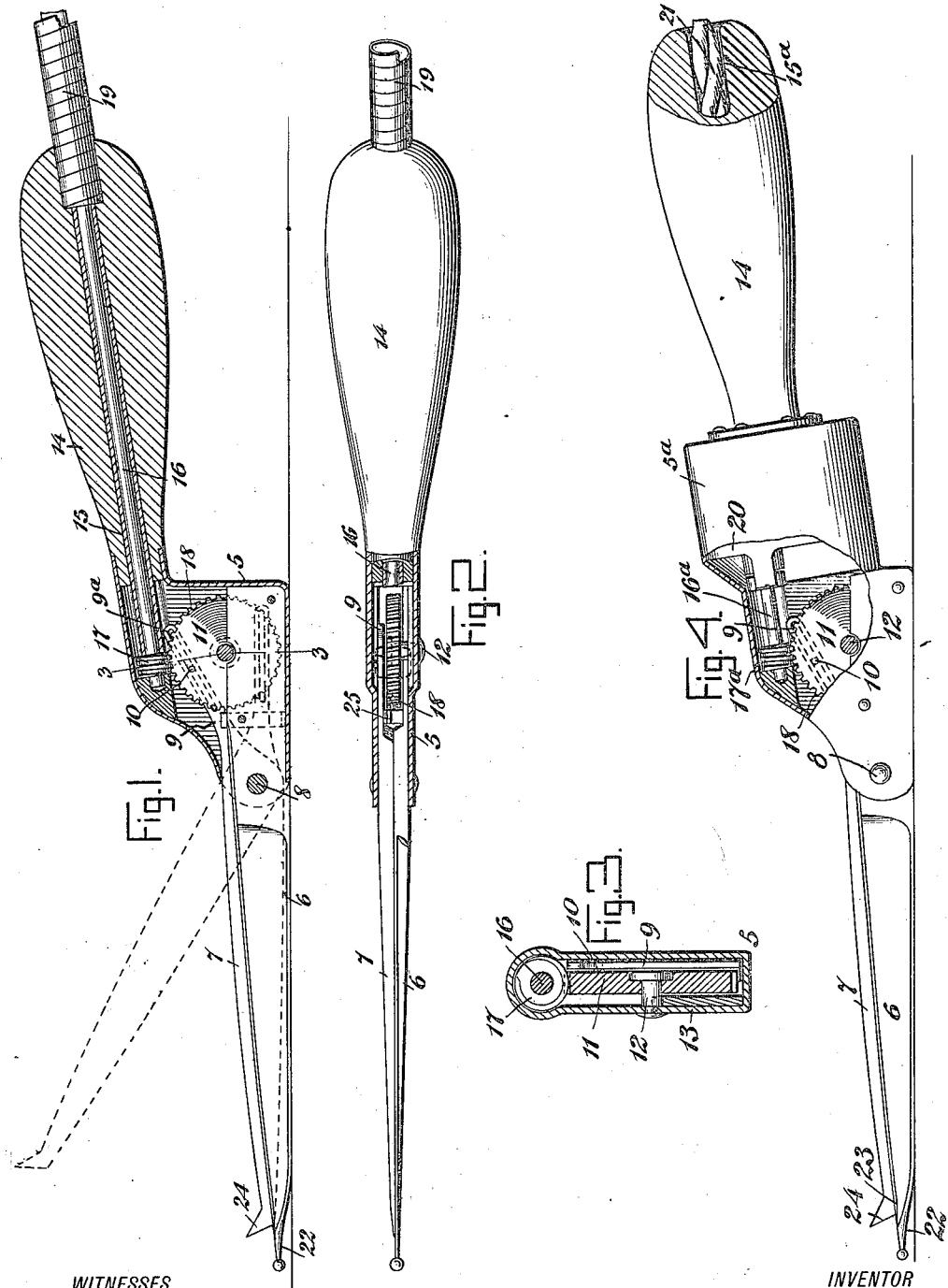
WITNESSES
INVENTOR
Washington I. Jones
BY
ATTORNEYS

UNITED STATES PATENT OFFICE.

WASHINGTON IRVING JONES, OF RUSHVILLE, NEW YORK.

MECHANICALLY-OPERATED SCISSORS.

1,129,684.  Specification of Letters Patent.  Patented Feb. 23, 1915.

Application filed April 4, 1914. Serial No. 829,481.

*To all whom it may concern:*

Be it known that I, WASHINGTON I. JONES, a citizen of the United States, and a resident of Rushville, in the county of Yates and State of New York, have invented new and Improved Mechanically-Operated Scissors, of which the following is a full, clear, and exact description.

My invention has for its object to provide a pair of scissors with a casing to which one of the scissor blades is secured, the other blade being pivoted to the casing and the first blade and being provided with a slotted arm in which is disposed a pin on a disk journaled for rotating in the casing so that with the rotation of the disk the scissors will be operated.

Additional objects of the invention will appear in the following specification in which the preferred form of my invention is disclosed.

In the drawings similar reference characters refer to similar parts in all the views in which—

Figure 1 is a longitudinal view in section showing my invention; Fig. 2 is a sectional plan view of Fig. 1; Fig. 3 is a sectional view on the line 3—3 of Fig. 1; and Fig. 4 is a side elevation of a modified form of my invention with parts broken away to show the operating mechanism.

By referring to the drawings it will be seen that a casing 5 is provided to which the scissor blade 6 is secured, the companion scissor blade 7 being pivoted at 8 to the scissor blade 6 and to the casing 5. Projecting rearwardly from the scissor blade 7 there is a slotted arm 9 in which is disposed a pin 10 projecting from a disk 11 which is journaled on a stud 12 secured to the side 13 of the casing 5. It will, therefore, be seen that with the rotation of the disk 11 the pin 10 will move in the slot 9$^a$ in the slotted arm 9 to operate the scissor blade 7 in the desired manner. Projecting rearwardly from the casing 5 there is a handle 14 having a longitudinal opening or bearing 15 in which is disposed a shaft 16, this shaft 16 having a worm 17 disposed on the casing which meshes with the teeth 18 on the periphery of the disk 11. To the shaft 16 there may be secured the flexible shaft 19, or if desired a motor may be coupled to this shaft 16 for rotating the shaft and thereby operating the scissor blade 7.

In the modified form of the invention shown in Fig. 4, the casing 5 has an enlargement 5$^a$ in which is disposed an electric motor 20 for rotating the shaft 16$^a$ to which the worm 17$^a$ is secured, the said worm wheel 17$^a$ meshing with the gear teeth 18 on the periphery of the disk 11. In the modified form of the invention, the wires 21 are disposed through the opening 15$^a$ in the handle, these wires 21 being connected with the motor 20. The other features of the invention as shown in Fig. 4 correspond with the construction as disclosed in the other figures.

It will be noticed that the lower scissor blade 6 has a projection 22 which extends beyond the cutting edge 23 of the blade 6, the function of this projection 22 being to support the cloth or other material which is being cut when the scissor blade 7 is brought down in operative position. The companion scissor blade 7 has an upwardly projecting terminal 24, the function of which is to prevent the goods or other material which is being cut, from slipping over the top of the scissor blade 7 when the scissor blade 7 is moved downwardly. The forward part of the blade 7 is held at all times in cutting position relatively to the blade 6 by a spring 25 which engages the arm 9.

Having thus described my invention I claim as new and desire to secure by Letters Patent:

In a pair of scissors, two blades pivoted together, a casing secured to one of the blades, a slotted arm extending from the other blade, a disk disposed substantially parallel with the plane of the cutting edges of the blades and rotatably mounted in the casing on a transverse axis, a pin on the disk disposed in the slot, a spindle journaled in a bearing in the casing above the disk and longitudinally of the cutting edges of the blades, and gearing connecting the spindle and the disk for rotating the latter.

In testimony whereof I have signed my name to this specification in the presence of the two subscribing witnesses.

WASHINGTON IRVING JONES.

Witnesses:
 GEO. B. ROOTH, Jr.,
 H. B. SMITH.